(12) United States Patent
Guo

(10) Patent No.: US 10,206,075 B2
(45) Date of Patent: Feb. 12, 2019

(54) METHOD, APPARATUS, AND SYSTEM FOR PROCESSING INCOMING CALLS

(71) Applicant: TENCENT TECHNOLOGY (SHENZHEN) COMPANY LIMITED, Shenzhen, Guangdong (CN)

(72) Inventor: Hua Guo, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/813,550

(22) Filed: Nov. 15, 2017

(65) Prior Publication Data

US 2018/0077544 A1    Mar. 15, 2018

Related U.S. Application Data

(63) Continuation of application No. PCT/NC2016/084017, filed on May 31, 2016.

(30) Foreign Application Priority Data

Aug. 27, 2015   (CN) .......................... 2015 1 0536506

(51) Int. Cl.
*H04W 4/16* (2009.01)
*H04M 1/57* (2006.01)
(Continued)

(52) U.S. Cl.
CPC ............... *H04W 4/16* (2013.01); *H04M 1/57* (2013.01); *H04M 1/725* (2013.01); *H04M 19/04* (2013.01); *H04W 4/027* (2013.01); *H04W 4/12* (2013.01)

(58) Field of Classification Search
CPC ......... H04W 4/16; H04W 4/027; H04W 4/12; H04M 1/57; H04M 1/725; H04M 19/04
(Continued)

(56) References Cited

U.S. PATENT DOCUMENTS 9,173,128 B2 * 10/2015 Backholm ......... H04W 28/0273
9,332,107 B1 *  5/2016 Persson .................. H04L 51/24
(Continued)

FOREIGN PATENT DOCUMENTS

CN          102761839 A      10/2012
CN          102783128 A      11/2012
(Continued)

OTHER PUBLICATIONS

International Search Report with Translation for International Application No. PCT/CN2016/084017 dated Sep. 6, 2016.
(Continued)

*Primary Examiner* — Mong-Thuy T Tran
(74) *Attorney, Agent, or Firm* — Knobbe Martens Olson & Bear LLP

(57) ABSTRACT

The present disclosure relates to a method, apparatus, and system for processing incoming calls. The method includes: determining whether a current state of a mobile terminal where a caller number is located meets an incoming call transfer condition in response to detecting that an incoming call is calling the caller number; and transferring the incoming call to a server in response to determining that the current state of the mobile terminal meets the incoming call transfer condition, for the server to send incoming call reminder information to a designated target application.

10 Claims, 7 Drawing Sheets

(51) Int. Cl.
*H04M 1/725* (2006.01)
*H04M 19/04* (2006.01)
*H04W 4/12* (2009.01)
*H04W 4/02* (2018.01)

(58) Field of Classification Search
USPC ........................................................ 455/417
See application file for complete search history.

(56) References Cited

U.S. PATENT DOCUMENTS

| | | | | |
|---|---|---|---|---|
| 2008/0085687 | A1* | 4/2008 | Brekke | H04M 1/6505 455/187.1 |
| 2008/0186929 | A1* | 8/2008 | Rice | H04L 65/104 370/338 |
| 2010/0241697 | A1* | 9/2010 | Bushell | G06F 9/5038 709/203 |
| 2012/0058756 | A1* | 3/2012 | Olincy | H04M 1/64 455/417 |

FOREIGN PATENT DOCUMENTS

| | | |
|---|---|---|
| CN | 102984334 A | 3/2013 |
| CN | 103369474 A | 10/2013 |
| CN | 105025097 A | 11/2015 |
| EP | 1040640 A1 | 10/2000 |

OTHER PUBLICATIONS

International Preliminary Report on Patentability for International Application No. PCT/CN2016/084017 dated Feb. 27, 2018, in 9 pages.

* cited by examiner

METHOD, APPARATUS, AND SYSTEM FOR PROCESSING INCOMING CALLS

CROSS-REFERENCE TO RELATED APPLICATIONS

This application is a continuation application of International Application No. PCT/CN2016/084017, filed on May 31, 2016, which claims the benefit of priority to Chinese Patent Application No. 201510536506.9 filed on Aug. 27, 2015 and entitled "METHOD, APPARATUS, and SYSTEM FOR PROCESSING INCOMING CALLS", the disclosures of which are incorporated herein by reference in their entirety.

FIELD OF THE TECHNOLOGY

The present application relates to communication networks and in particular to a method, apparatus and system for processing incoming calls.

BACKGROUND OF THE DISCLOSURE

At present, when a user plays an online game, watches an online video, watches a live sports event, or performs other network communications under a third generation of wireless mobile telecommunications technology (3G) or fourth generation of wireless mobile telecommunications technology (4G) network environment, sometimes the network access may be interrupted by an incoming call, which brings a bad internet surfing experience to the user.

SUMMARY

The embodiments of the present disclosure provide a method, apparatus, and system for processing incoming calls, to prevent incoming calls from interrupting network access, and provide an incoming call reminder service for the user.

The embodiments of the present disclosure provide a method for processing incoming calls, including:
determining whether a current state of a mobile terminal where a caller number is located meets an incoming call transfer condition in response to detecting that an incoming call is calling the caller number, in which the incoming call transfer condition comprises the mobile terminal being using network access; and
transferring the incoming call to a server in response to determining that the current state of the mobile terminal meets the incoming call transfer condition, for the server to send incoming call reminder information to a designated target application.

The embodiments of the present disclosure further provide an apparatus for processing incoming calls, including: a processor and a memory, in which the memory stores instruction modules executable by the processor, and the instruction modules include:
a determination module to determine whether a current state of a mobile terminal where a caller number is located meets an incoming call transfer condition in response to detecting that an incoming call is calling the caller number, in which the incoming call transfer condition comprises the mobile terminal being using network access; and
a transfer module to transfer the incoming call to a server in response to determining that the current state of the mobile terminal meets the incoming call transfer condition, for the server to send incoming call reminder information to a designated target application.

The embodiments of the present disclosure provides a non-transitory computer-readable storage medium, including instructions executable by one or more processors to cause the one or more processors to perform operations including:
determining whether a current state of a mobile terminal where a caller number is located meets an incoming call transfer condition in response to detecting that an incoming call is calling the caller number, in which the incoming call transfer condition comprises the mobile terminal being using network access; and
transferring the incoming call to a server in response to determining that the current state of the mobile terminal meets the incoming call transfer condition, for the server to send incoming call reminder information to a designated target application.

The embodiments further provide a system for processing incoming calls, including an apparatus for processing incoming calls and a server, in which,
the apparatus for processing incoming calls is the apparatus mentioned in the above; and
the server is configured to receive an incoming call transferred and send incoming call reminder information to a designated target application in response to detecting that the incoming call is calling a caller number, and a mobile terminal where the caller number is located meeting an incoming call transfer condition.

The embodiments of the present disclosure provide a method, apparatus and system for processing incoming calls, when it is detected that an incoming call is calling a caller number, if the current state of a mobile terminal where the caller number is located meets an incoming call transfer condition, then the incoming call is transferred to a server, and the server sends incoming call reminder information to a designated target application. In this way, through the call transfer function, the embodiments of the present disclosure can prevent incoming calls from disturbing the user, and can avoid interruption in network access caused by the incoming calls. In addition, the server may collect incoming call information and send incoming call reminder information to an application on the mobile terminal, or send the incoming call reminder information as an instant messaging message to an account of an application that supports instant messaging (e.g., an account of the QQ application or the Wechat application) designated by the user to carry out the incoming call reminder service, so as to greatly improve the incoming call processing flexibility and user experience.

DESCRIPTION OF EMBODIMENTS

It is to be understood that the detailed embodiments are described herein with the drawings.

In some network environments, such as a 3G or 4G network environment, a user sometimes may need to keep network connectivity while blocking incoming calls. Among traditional approaches of blocking incoming calls, some can only block all incoming calls, and in these approaches, a user cannot receive reminder information of the related incoming calls; and for others, an operator may provide a Short Message Service (SMS) incoming call reminder service, but need to charge fees for the service. Moreover, the traditional incoming call reminder service is only limited to receiving incoming call reminders by a designated mobile phone number, and in the case of a mobile phone which has the designated mobile phone number being power off, even if the mobile phone enables the incoming call reminder service provided by the operator, it still cannot receive a related reminder.

According to embodiments of the present disclosure, when it is detected that an incoming call is calling a caller number, if the current state of a mobile terminal where the caller number is located meets an incoming call transfer condition, then the incoming call is transferred to a server, so that the server sends incoming call reminder information to a designated target application. In this way, through the call transfer function, the embodiments of the present disclosure can prevent incoming calls from disturbing the user and interrupting the network access. In addition, the server may collect information on the incoming calls and send incoming call reminder information to an application on the mobile terminal, or send the incoming call reminder information as an instant messaging message to an account of an application (e.g., an account of the QQ application or the Wechat application) that supports instant messaging designated by the user, to carry out the incoming call reminder service, so as to greatly improve the incoming call processing flexibility and user experience. The application that supports instant messaging for example is in the form of web page.

Figure 1:
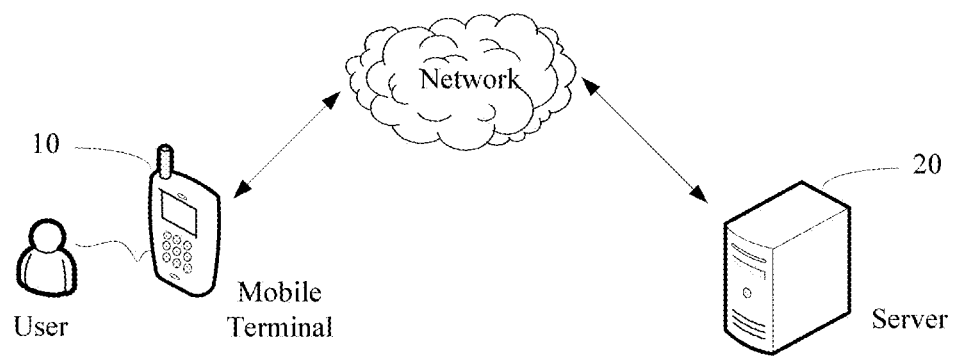
FIG. 1 is a schematic diagram of architecture of a system for processing incoming calls according to an embodiment of the present disclosure.

FIG. 1 shows a system for processing incoming calls according to an embodiment of the present disclosure. The system includes a mobile terminal 10 and a server 20, in which an apparatus for processing incoming calls may be located on the mobile terminal 10 or on the network server 20 in the form of software or hardware.

In the system shown in FIG. 1, as an example, the apparatus for processing incoming calls is located on the mobile terminal 10 in the form of software. The mobile terminal 10 is installed with the application for processing incoming calls to intercept incoming calls and provide a corresponding incoming call reminder service, so as to conduct a call transfer function to prevent incoming calls from disturbing the user and interrupting the network access; in addition, the server 20 may collect information on the incoming calls and send incoming call reminder information to the application for processing incoming calls on the mobile terminal 10, or send the incoming call reminder information as an instant messaging message to an account of an application (e.g., an account of the QQ application or the Wechat application) that supports instant messaging designated by the user, to carry out the incoming call reminder service, so as to greatly improve the incoming call processing flexibility and user experience.

Specifically, when the network side of the mobile terminal 10 detects that an incoming call is calling a caller number of the mobile terminal 10, it determines whether a current state of the mobile terminal 10 meets an incoming call transfer condition. If the current state of the mobile terminal 10 meets the incoming call transfer condition, the incoming call is transferred to the server 20, and the server 20 sends incoming call reminder information to a target application designated.

A method for determining whether the current state of the mobile terminal 10 meets the incoming call transfer condition may be:

determining whether the mobile terminal 10 currently has enabled an incoming call reminder service, or determining whether the mobile terminal 10 is currently in a set scenario. The set scenario for example includes a scenario of running an online application (e.g., an online game) and/or playing an online video, and/or a scenario of power off, busy or out of service.

The server 20 receives the transferred incoming call and sends the incoming call reminder information to the designated target application when it is detected that the incoming call is calling the caller number and that the current state of the mobile terminal 10 where the caller number is located meets the incoming call transfer condition.

Further, if the current state of the mobile terminal 10 does not meet the incoming call transfer condition, then the mobile terminal 10 accepts the incoming call for the user to make a response to it, e.g., answer it.

The server 20 further sends the incoming call reminder information to the mobile terminal 10, or an application on the mobile terminal 10, or other target applications designated by the user.

According to the embodiment of the present disclosure, the server 20 may send the incoming call reminder information to the application on the mobile terminal 10. Of course, the server 20 may also send the incoming call reminder information as an instant messaging message to the account of the target application (e.g., an account of the QQ application or the Wechat application) that supports instant messaging designated by the user, and the target application may run on other mobile terminals.

Therefore, the mobile terminal 10 may be configured with the designated target application to receive the incoming call reminder information in advance, and send the configuration information of the designated target application to the server 20, so that the server 20 sends the incoming call reminder information to the designated target application.

In addition, the mobile terminal 10 may also be configured with an incoming call reminder service and a Do-Not-Disturb (DND) mode which may be classified as an automatic mode and a manual mode depending on different scenarios.

For the automatic mode, for example, the mobile terminal 10 may be configured to automatically transfer an incoming call to the server 20 in a circumstance where the network is active (e.g., the user is watching an online video, is watching an online program, or is playing an online game), and the server 20 sends an incoming call reminder message to the user when there is an incoming call; or the mobile terminal 10 may be configured to automatically transfer an incoming call to a preset telephone number for the user to answer.

For the manual mode, for example, the mobile terminal may be configured to prompt the user whether to enable the DND mode or the incoming call reminder service during a scenario of power off, busy, or out of service or before playing a game. If the user confirms to enable the DND mode or the incoming call reminder service, then the mobile terminal enables the DND mode or the incoming call reminder service according to an operation instruction from the user. Of course, the manual mode may also be configured for during network communications, such as performing a video live and downloading a file, to prompt the user whether to enable the DND mode or the incoming call reminder service.

In this way, through the DND mode, the interruption in network access caused by an incoming call may be avoided, and through the incoming call reminder, a situation of unable to receive an incoming call reminder or read incoming call information due to the mobile phone being low battery, long time busy, or the user forgetting to take the mobile phone may be avoided.

The mobile terminal 10 determines whether to enable the DND mode in different scenarios according to the setting rules described above.

In addition, when configuring an incoming call reminder service policy for the mobile terminal, an account of a target application such as an account of the QQ application, the Wechat application or the Weibo application that supports instant messaging to which the incoming call reminder information is sent may be configured for the mobile terminal 10.

Therefore, through the call transfer function, the embodiment can prevent incoming calls from disturbing the user and interrupting the network access; in addition, the server may collect information on the incoming calls and send incoming call reminder information to an application on the mobile terminal, or send the incoming call reminder information as an instant messaging message to an account of an application (e.g., an account of the QQ application or the Wechat application) that supports instant messaging designated by the user, to carry out the incoming call reminder service, so as to greatly improve the incoming call processing flexibility and user experience.

An example of a specific application scenario is as follows:

When the user is using a mobile phone, he may configure the mobile phone to enable an incoming call reminder service when the mobile phone enters into a game application, and may configure an account of the QQ application to receive incoming call reminder information in advance.

When the user is playing the game using the mobile phone and receives an incoming call, since the mobile phone has enabled the incoming call reminder service, the mobile phone automatically transfers the incoming call to the server, and the server sends incoming call reminder information to the account of the QQ application of the user. Thus, the user can receive the incoming call reminder information through his account of the QQ application. The QQ application may run on the current mobile phone of the user, or may run on a computer or other mobile phones. In this way, through the call transfer function, the embodiment can prevent incoming calls from disturbing the user and interrupting the network access as to affect the user to operate the game. In addition, the server may collect information on the incoming calls and send the incoming call reminder information to the application on the mobile terminal, or send the incoming call reminder information as an instant messaging message to an account of an application (e.g., an account of the QQ application, or the Wechat application) that supports instant messaging designated by the user, to provide the incoming call reminder service, so as to greatly improve the incoming call processing flexibility and user experience.

A mobile phone that implements various embodiments of the present disclosure will be described in the following with reference to the accompanying drawings. In the following description, the use of suffixes such as "module", "part" or "unit" to indicate an element is in order to facilitate the description of the present disclosure, and do not have a particular meaning. Thus, "module" and "part" can be used in combination.

The mobile terminal described above may be implemented in various forms. For example, the terminals described in present disclosure may include mobile terminals such as mobile phones, smart phones, laptops, digital broadcast receivers, PDAs (personal digital assistants), PADs (tablets), PMPs (portable multimedia players), wearable devices (such as smart hand rings, smart watches, etc.), and navigation devices.

Hereinafter, the terminal is a mobile terminal for example. However, the structure according to the embodiment of the present disclosure may be applied to a fixed terminal except for elements particularly for the purpose of movement.

Figure 2:
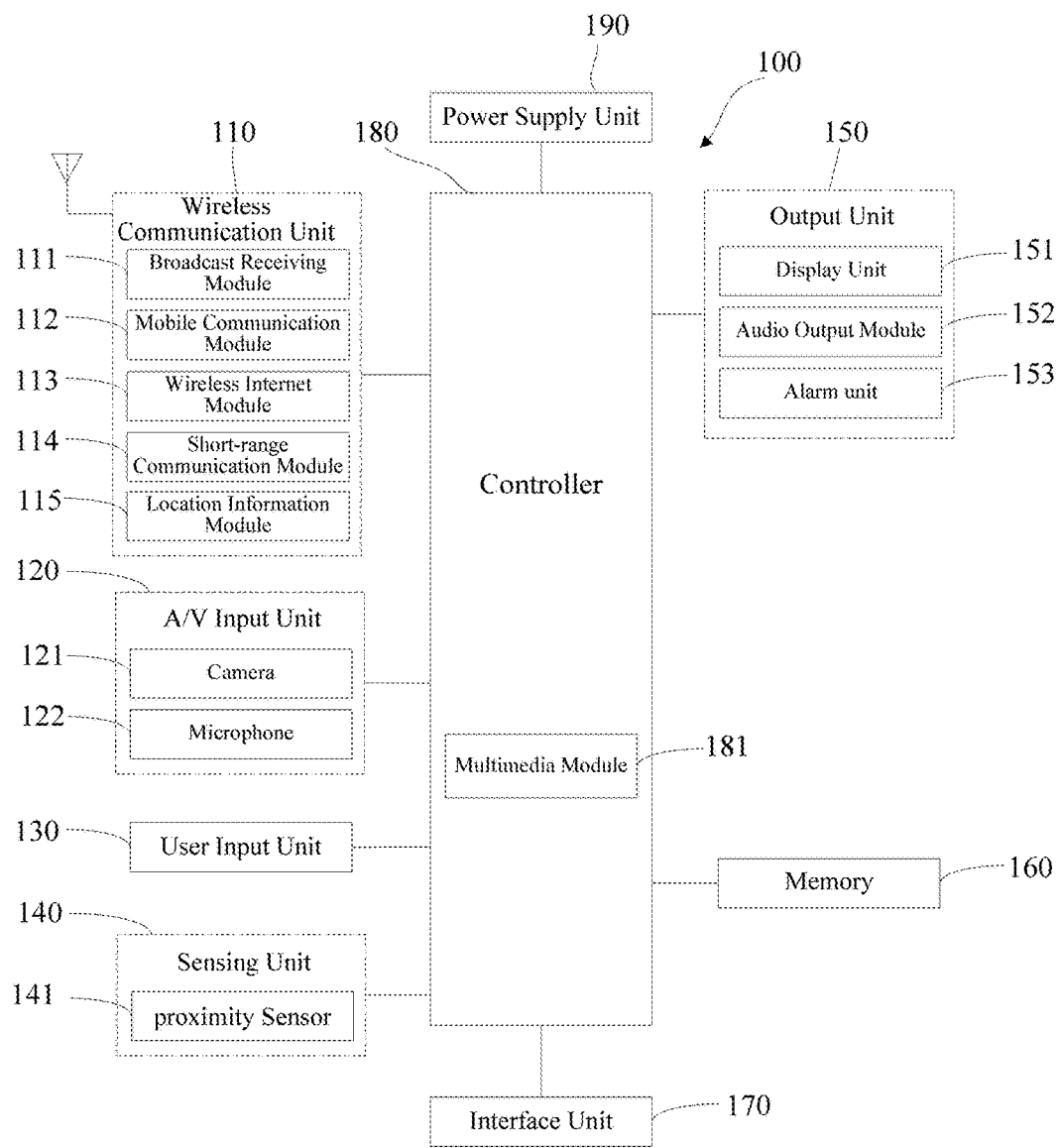
FIG. 2 is a schematic diagram of a hardware configuration of a mobile terminal according to an embodiment of the present disclosure.

As shown in FIG. 2, FIG. 2 is a schematic diagram of a hardware configuration of a user terminal (mobile terminal) implementing various embodiments of the present disclosure.

The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190, etc.

FIG. 2 shows the mobile terminal with various components, but it is to be understood that all the illustrated components are not necessarily to be implemented. More or fewer components may be implemented instead. The elements of the mobile terminal will be described in detail as follows.

The wireless communication unit 110 typically includes one or more components that allow radio communications between the mobile terminal 100 and a wireless communication system or network. For example, the wireless communication unit may include a broadcast receiving module 111, a mobile communication module 112, a wireless internet module 113, a short-range communication module 114, and a location information module 115.

The broadcast receiving module 111 receives broadcast signals and/or broadcast-related information from an external broadcast management server via a broadcast channel. The broadcast channel may include a satellite channel and/or a terrestrial channel. The broadcast management server may be a server that generates and transmits a broadcast signal and/or broadcast-related information or receives a previously generated broadcast signal and/or broadcast-related information and transmits it to a server of the terminal. The broadcast signal may include the TV broadcast signal, the radio broadcast signal, the data broadcast signal, and the like. Also, the broadcast signal may further include a broadcast signal combined with a TV or radio broadcast signal. The broadcast-related information may also be provided via a mobile communication network, and in this case, the broadcast-related information may be received by the mobile communication module 112. The broadcast signal may exist in various forms, for example, it may exist in the form of Digital Multimedia Broadcasting (DMB) Electronic Program Guide (EPG), Digital Video Broadcasting Handheld (DVB-H) Electronic Service Guide (ESG), etc. The broadcast receiving module 111 may receive signal broadcast by using various types of broadcasting systems. In particular, the broadcast receiving module 111 may be implemented by using a digital broadcast system such as Digital Multimedia Broadcasting-Terrestrial (DMB-T), Digital Multimedia Broadcasting-Satellite (DMB-S), Digital Video Broadcasting-Handheld (DVB-H), Forward Link Media (MediaFLO@) digital broadcasting system, Integrated Services Digital Broadcasting-Terrestrial (ISDB-T) digital broadcasting system, and the like, to receive digital broadcasting. The broadcast receiving module 111 may be configured as a variety of broadcasting systems suitable for providing broadcast signals and the above-described digital broadcasting system. The broadcast signal and/or the broadcast-related information received via the broadcast receiving module 111 may be stored in the memory 160 (or other type of storage medium).

The mobile communication module 112 sends radio signals to and/or receives radio signals from at least one of a base station (e.g., an access point, or a Node B), an external terminal, and a server. Such radio signals may include voice call signals, video call signals, or various types of data transmitted and/or received according to text and/or multimedia messages.

The wireless internet module 113 supports wireless internet access of the mobile terminal. The wireless internet module 113 may be internally or externally coupled to the terminal. The wireless internet access technologies involved in this module may include Wireless Local Area Network (WLAN) (Wi-Fi), Wireless Broadband (Wibro), Worldwide Interoperability for Microwave Access (Wimax), High Speed Downlink Packet Access (HSDPA), and so on.

The short-range communication module 114 is a module for supporting short-range communication. Some examples of short-range communication technologies include Bluetooth™, Radio Frequency Identification (RFID), Infrared Data Association (IrDA), Ultra Wideband (UWB), Purple Bee™, and so on.

The location information module 115 is a module for checking or obtaining the location information of the mobile terminal. A typical example of the location information module is a GPS (Global Positioning System). The location information module 115 may, for example, calculate distance information from three or more satellites and accurate time information and apply a triangulation method to the calculated information to accurately calculate three-dimensional current position information based on the longitude, latitude and altitude. According to the embodiments of the present application, the method for calculating the position and time information uses three satellites and uses an additional satellite to correct the error of the position and time information calculated. In addition, the location information module 115 can calculate speed information by continuously calculating the current position information in real time.

The A/V input unit 120 is configured to receive audio or video signals. The A/V input unit 120 may include a camera 121 and a microphone 122. The camera 121 processes image data of a still picture or a video obtained by an image capturing apparatus in a video capturing mode or an image capturing mode. The processed image frame may be displayed on the display unit 151. The image frame after processed by the camera 121 may be stored in the memory 160 (or other storage medium) or transmitted via the wireless communication unit 110, and two or more cameras 121 may be provided according to the configuration of the mobile terminal. The microphone 122 may receive sound (audio data) via a microphone in a telephone call mode, a recording mode, a voice recognition mode, and the like, and can process such a sound as audio data. The processed audio (speech) data may be converted to a format that can be transmitted to the mobile communication base station via the mobile communication module 112 in the case of the telephone call mode, and is then output. The microphone 122 may implement various types of noise elimination (or suppression) algorithms to eliminate (or suppress) the noise or interference generated during the reception and transmission of the audio signal.

The user input unit 130 may generate key input data based on commands input by the user to control various operations of the mobile terminal. The user input unit 130 allows the user to input various types of information and may include a keyboard, a metal dome, a touch panel (e.g., a touch-sensitive assembly that detects changes in resistance, pressure, or capacitance caused due to contact), a wheel, and a stick and so on. In particular, when the touch panel is superimposed on the display unit 151 in the form of a layer, a touch screen may be formed.

The sensing unit 140 detects a current state of the mobile terminal 100 (e.g., an enable or closed state of the mobile terminal 100), a position of the mobile terminal 100, contact (i.e., a touch input) of the user to the mobile terminal 100, an orientation of the mobile terminal 100, an accelerated or decelerated movement and movement direction of the mobile terminal 100 and the like, and generates a command or signal for controlling the operation of the mobile terminal 100. For example, when the mobile terminal 100 is implemented as a sliding type mobile phone, the sensing unit 140 may sense whether the sliding type telephone is turned on or off. In addition, the sensing unit 140 can detect whether the power supply unit 190 provides power and/or whether the interface unit 170 is coupled with an external device. The sensing unit 140 may include a proximity sensor 141, which will be described below in conjunction with a touch screen.

The interface unit 170 includes an interface for connecting the mobile terminal 100 to at least one external device. For example, the external device may include a wired or wireless headset port, an external power (or battery charger) port, a wired or wireless data port, a memory card port, a port for connecting a device with an identification module, an audio input/output (I/O) port, a video I/O port, a headphone port, and so on. The identification module may store various kinds of information that is used to authenticating a user using the mobile terminal, and may include a User Identification Module (UIM), a Subscriber Identification Module (SIM), a Universal Subscriber Identification Module (USIM), and the like. In addition, a device having an identification module (hereinafter referred to as an "identification device") may take the form of a smart card, and thus the identification device may be connected to the mobile terminal 100 via a port or other connection device. The interface unit 170 may receive input (e.g., data information and electricity power) from an external device and transmit the received input to one or more elements within the mobile terminal 100, or may be used to transmit data between the mobile terminal and the external devices.

In addition, when the mobile terminal 100 is connected to an external base, the interface unit 170 may be used as a path through which power may be supplied from the base to the mobile terminal 100, or may be used as a path through which various command signals input from the base may be transmitted from the base to the mobile terminal 100. The various command signals or power input from the base may be used as signals for identifying whether the mobile terminal is accurately mounted on the base. The output unit 150 is configured to provide an output signal (e.g., an audio signal, a video signal, an alarm signal, or a vibration signal) in a visual, audio and/or tactile manner. The output unit 150 may include a display unit 151, an audio output module 152, an alarm unit 153, and the like.

The display unit 151 may display information processed in the mobile terminal 100. For example, when the mobile terminal 100 is in the telephone call mode, the display unit 151 may display a user interface (UI) or a graphical user interface (GUI) associated with a call or other communication (e.g., text messaging and multimedia file downloading). When the mobile terminal 100 is in the video call mode or the image capturing mode, the display unit 151 may display a captured image and/or a received image, a UI or GUI showing a video or image and related functions, etc.

Meanwhile, when the display unit 151 and the touch panel are superimposed on each other in the form of a layer to form a touch screen, the display unit 151 may be used as an input device and an output device. The display unit 151 may include at least one of a liquid crystal display (LCD), a thin film transistor LCD (TFT-LCD), an organic light emitting diode (OLED) display, a flexible display, a three dimensional (3D) display, and the like. Some of these displays may be constructed as transparent to allow the user to view from the outside, which may be referred to as a transparent display, and a typical transparent display may be, for example, a TOLED (Transparent Organic Light Emitting Diode) display and the like. The mobile terminal 100 may include two or more display units (or other display devices) according to a particular desired implementation. For example, the mobile terminal may include an external display unit (not shown) and an internal display unit (not shown). The touch screen may be used to detect a touch input pressure as well as a touch input position and a touch input area.

The audio output module 152 may convert the audio data received by the wireless communication unit 110 or stored in the memory 160 into an audio signal and output as sound, when the mobile terminal is in a call signal reception mode, a call mode, a recording mode, a voice recognition mode, a broadcast reception mode, and the like. Also, the audio output module 152 may provide an audio output (e.g., a call signal reception sound or a message reception sound) associated with a particular function performed by the mobile terminal 100. The audio output module 152 may include a speaker, a buzzer, and the like.

The alarm unit 153 may provide an output to notify the mobile terminal 100 of the occurrence of an event. Typical events may include call reception, message reception, key signal input, touch input, and the like. In addition to the audio or video output, the alarm unit 153 may provide outputs in different manners to inform the occurrence of events. For example, the alarm unit 153 may provide an output in the form of vibration. The alarm unit 153 may provide a tactile output (i.e., vibrate) to inform the user when a call, message, or some other incoming communication is received. By providing such tactile outputs, the user can recognize the occurrence of various events even when the user's mobile phone is in the user's pocket. The alarm unit 153 may also provide an output to notify the occurrence of an event via the display unit 151 and/or the audio output module 152.

The memory 160 may store processing and control operation software programs and the like executable by the controller 180, or may temporarily store data (e.g., phone books, messages, still images, and videos) that have been output or to be output. Also, the memory 160 may store data on various vibration and audio signals output when the touch is applied to the touch screen.

The memory 160 may include at least one type of storage medium including a flash memory, a hard disk, a multimedia card, a card type memory (e.g., a SD or DX memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a Magnetic Memory, a Disk, a CD, and so on. Also, the mobile terminal 100 may cooperate with a network storage device that performs a storage function of the memory 160 through a network connection.

The controller 180 generally controls the overall operations of the mobile terminal. For example, the controller 180 performs control and processing related to voice calls, data communications, video calls, and the like. In addition, the controller 180 may include a multimedia module 181 for reproducing (or playing back) the multimedia data, the multimedia module 181 may be configured within the controller 180, or may be configured to be detached from the controller 180. The controller 180 may perform pattern recognition processing to recognize a handwriting input or a picture drawing input performed on the touch screen as a character or an image. The controller 180 may include a processing unit, an ASIC, a logic unit, or a programmable gate array, and the like, for example, a central processing unit (CPU).

The power supply unit 190 receives external power or internal power under the control of the controller 180 and provides appropriate power required to operate the components and elements.

The various embodiments described herein may be implemented using computer-readable media using, for example, computer software, hardware, or any combination thereof. For implementations of the hardware, the embodiments described herein may be implemented by using an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, an electronic unit designed to perform at least one of the functions described herein. And in some cases, such an implementation may be implemented in the controller 180. The implementation of software, such as a process or function, may be implemented with a separate software module that allows execution of at least one function or operation. The software code may be implemented by a software application (or program) written in any suitable programming language, which may be stored in the memory 160 and executed by the controller 180.

At this point, the mobile terminal has been described in terms of its functions.

Hereinafter, for the sake of simplicity, a sliding type mobile terminal of various types of mobile terminals such as a folding type, a straight type, a swing type, and a sliding type mobile terminal will be described as an example.

Accordingly, the present disclosure may be applied to any type of mobile terminal, and is not limited to a sliding type mobile terminal.

The mobile terminal 100 as shown in FIG. 2 may be configured to operate with a communication system such as a wired and wireless communication system that transmits data via frames or packets and a satellite-based communication system.

A communication system in which a mobile terminal according to the present disclosure can operate will now be described with reference to FIG. 3.

Such a communication system may use different air interfaces and/or physical layers. For example, an air interface used by the communication system includes, for example, Frequency Division Multiple Access (FDMA), Time Division Multiple Access (TDMA), Code Division Multiple Access (CDMA), and Universal Mobile Telecommunications System (UMTS) (in particular, Long Term Evolution (LTE)), Global System for Mobile Communications (GSM), and so on. By way of non-limiting example, the following description relates to a CDMA communication system, but such teachings are equally applicable to other types of systems.

Figure 3:
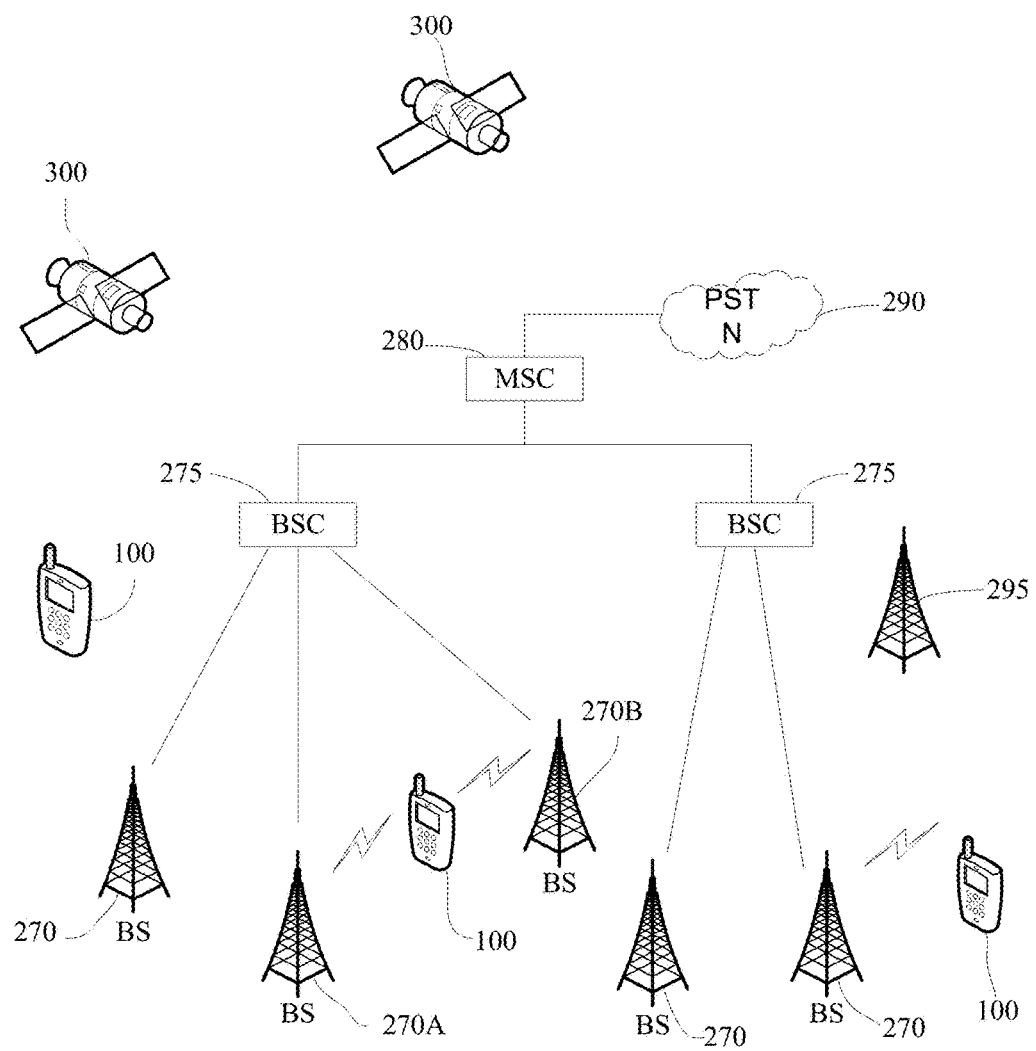
FIG. 3 is a schematic diagram of a wireless communication system of a mobile terminal as shown in FIG. 2.

Referring to FIG. 3, a CDMA wireless communication system may include a plurality of mobile terminals 100, a plurality of base stations (BS) 270, a base station controller (BSC) 275, and a mobile switching center (MSC) 280. The MSC 280 is configured to interface with a public switched telephone network (PSTN). The MSC 280 is also configured to interface with a BSC 275 that may be coupled to the base station 270 via a backhaul line. The backhaul line may be constructed according to any of a number of known interfaces including, for example, E1/T1, Asynchronous Transfer Mode (ATM), Internet Protocol (IP), Point-to-Point Protocol (PPP), frame relay, High-speed Digital Subscriber Line (HDSL), Asymmetric Digital Subscriber Line (ADSL) or xDSL, and so on. It will be appreciated that the system shown in FIG. 3 may include a plurality of BSCs 275.

Each BS 270 may serve one or more partitions (or regions), and the respective partitions that are covered by multi-directional antennas or by antennas directed in a particular direction are radially away from the BS 270. Or each partition may be covered by two or more antennas for diversity reception. Each BS 270 may be configured to support multiple frequency allocations, and each frequency allocation has a specific spectrum (e.g., 1.25 MHz, 5 MHz, etc.).

The intersection of partition and frequency allocation may be referred to as a CDMA channel. The BS 270 may also be referred to as a base transceiver station (BTS) subsystem or other equivalent terms. In such a case, the term "base station" may be used to generally represent a single BSC 275 and at least one BS 270. The base station may also be referred to as a "cellular station". Or, the respective partitions of a particular BS270 may be referred to as a plurality of cellular stations.

As shown in FIG. 3, the broadcast transmitter (BT) 295 transmits a broadcast signal to the mobile terminal 100 operating within the system. The broadcast receiving module 111 shown in FIG. 2 is provided at the mobile terminal 100 to receive the broadcast signal transmitted by the BT 295. In FIG. 3, several Global Positioning System (GPS) satellites 300 are shown. The satellites 300 help locate at least one of the plurality of mobile terminals 100.

In FIG. 3, a plurality of satellites 300 are depicted, but it is understood that useful positioning information may be obtained using any number of satellites. The location information module 115 shown in FIG. 2 is typically configured to cooperate with the satellite 300 to obtain the desired location information. Instead of GPS tracking technology or in addition to GPS tracking technology, other techniques that can track the location of the mobile terminal may be used. In addition, at least one GPS satellite 300 may selectively or additionally process the satellite DMB transmission.

As a typical operation of the wireless communication system, the BS 270 receives reverse link signals from various mobile terminals 100. The mobile terminal 100 is typically involved in making a call, messaging, and other types of communication. Each reverse link signal received by a particular base station 270 is processed within the particular BS 270. The obtained data is forwarded to an associated BSC 275. The BSC provides call resource allocation and a mobile management function that coordinates soft handovers between BSs 270. The BSC 275 also routes the received data to the MSC 280, which provides additional routing services for interfacing with the PSTN 290. Similarly, the PSTN 290 forms an interface with the MSC 280, the MSC forms an interface with the BSC 275, and the BSC 275 controls the BS 270 accordingly to send forward link signals to the mobile terminal 100. The mobile terminal 100 may switch between different base stations (e.g., base stations 270A and 270B).

Based on the foregoing system architecture, the mobile terminal hardware structure and the communication system, embodiments of the method for processing incoming calls are proposed.

Figure 4:
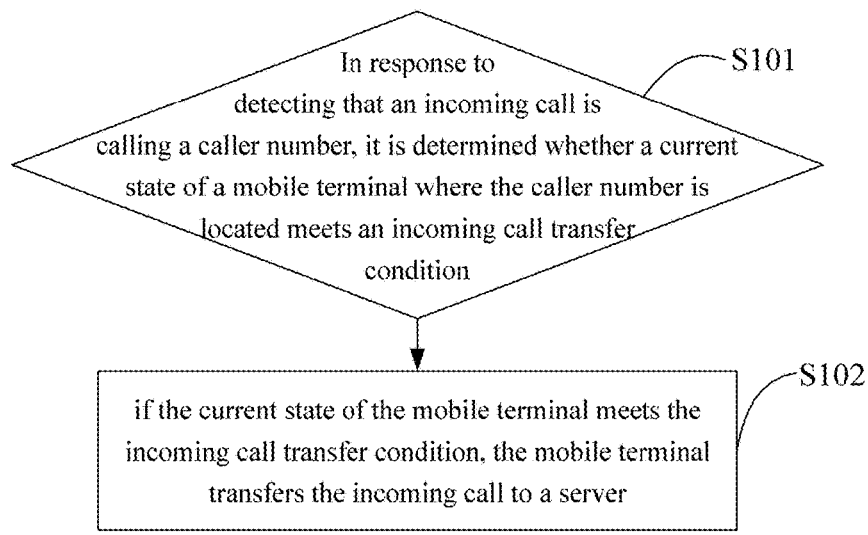
FIG. 4 is a flowchart of a method for processing incoming calls according to an embodiment of the present disclosure.

FIG. 4 shows a method for processing incoming calls according to an embodiment of the present disclosure. The method includes the following steps:

At step S101, in response to detecting that an incoming call is calling a caller number, it is determined whether a current state of a mobile terminal where the caller number is located meets an incoming call transfer condition. The incoming call transfer condition includes for example, the mobile terminal being using network access.

The embodiment of the present disclosure can realize the interception of incoming calls and carry on a corresponding call reminder service, to prevent incoming calls from disturbing the user and interrupting the network access through a call transfer function; in addition, the server may collect information on the incoming calls, and send incoming call reminder information to an application on the mobile terminal, or send the incoming call reminder information as an instant messaging message to an account of an application (e.g., an account of the QQ application or the Wechat application) that supports instant messaging designated by the user, to carry out the incoming call reminder service, so as to greatly improve the incoming call processing flexibility and user experience.

Specifically, when the network server or the network side of the mobile terminal (in the present embodiment, the mobile terminal is used an example) detects that an incoming call is calling a caller number of the mobile terminal, it determines whether a current state of the mobile terminal meets an incoming call transfer condition; and if the current state of the mobile terminal meets the incoming call transfer condition, then the mobile terminal transfers the incoming call to a server, so that the server sends incoming call reminder information to a designated target application.

The following manners may be used to determine whether the current state of the mobile terminal meets the incoming call transfer condition:

determining whether the mobile terminal currently has enabled an incoming call reminder service or a DND mode, or determining whether the current state of the mobile terminal is in a set scenario. The set scenario for example includes a scenario of running an online application or playing an online video with the network access, and/or a scenario of power off, busy, or out of service.

The enablement of the incoming call reminder service or the DND mode may be configured according to different scenarios in advance, and may be classified as an automatic mode and a manual mode.

For the automatic mode, for example, the mobile terminal may be configured to automatically transfer an incoming call to the server in a circumstance where the network is active (e.g., the user is watching an online video, is watching a live program, or entering into an online game), and when there is an incoming call, the server may send an incoming call reminder message to the user, or may automatically transfer the incoming call to a preset telephone number for the user to answer.

For the manual mode, for example, the mobile terminal may be configured to prompt the user whether to enable the incoming call reminder service or the DND mode during a scenario of power off, busy, or out of service, or before a game, and if the user confirms to enable the DND mode or the incoming call reminder service, then the mobile terminal enables the DND mode or the incoming call reminder service. Therefore, through the incoming call reminder service, the situation where a user cannot receive an incoming call reminder or view incoming call information due to low battery, long time busy, forgetting to taking the mobile phone, etc. may be avoided.

The mobile terminal determines whether to enable the DND mode or the incoming call reminder service in different scenarios according to the above setting rules.

After receiving an incoming call, the mobile terminal first determines whether the current state of the local meets the incoming call transfer condition so as to accept the incoming call, or perform the DND operation and the reminder service for the incoming call.

In step S102, in response to determining that the current state of the mobile terminal meets the incoming call transfer condition, the mobile terminal transfers the incoming call to a server, so that the server sends incoming call reminder information to a target application designated.

Specifically, if it is determined that the current state of the mobile terminal meets the incoming call condition, the mobile terminal transfers the incoming call to the server, so that the server sends the incoming call reminder information to the designated target application.

According to embodiments of the present disclosure, the server may send the incoming call reminder information to an application on the mobile terminal. The server may also send the incoming call reminder information as an instant messaging message to an account of a target application (e.g., an account of the QQ application or the Wechat application) that supports instant messaging designated by the user, and the target application may run on other mobile terminals.

Therefore, the mobile terminal may be configured with a designated target application to receive the incoming call reminder information in advance, and send the configuration information on the designated target application to the server, so that the server sends the incoming call reminder information to the designated target application.

The mobile terminal may also accept the incoming call when the current state of the mobile terminal does not meet the incoming call transfer condition according to a user setting policy; or may transfer the incoming call to a designated telephone number according to the user setting policy.

If the preconfigured policy is to transfer an incoming call to the server, then the mobile terminal transfers the incoming call to the server; and if the preconfigured policy is to transfer an incoming call to a designated telephone number, then the mobile terminal transfers the incoming call to the designated telephone number.

The preconfigured policy may be set by the user in advance according to actual situations. In the embodiment, according to a default setting, when the mobile terminal enables the DND mode or the incoming call reminder service, the mobile terminal transfers the incoming call to the server, so that the server processes the incoming call accordingly, e.g., transferring the incoming call to other mobile terminals, or making a corresponding incoming call reminder.

In addition, if the mobile terminal has not enabled the DND mode or the incoming call reminder service locally, according to the embodiment of the present disclosure, the incoming call may be directed to the mobile terminal; or the incoming call may be transferred to the server according to the user's operating instruction temporally, so that the server accepts the incoming call or makes a corresponding incoming call reminder.

Compared to the traditional technology, in which when network communications are carried out, e.g., a user playing an online game, watching an online video, watching an online sports event or performing other network communications under the network access environment, usually the network access will be interrupted by an incoming call, which brings a bad surfing experience for the user, the embodiments of the present disclosure can prevent the incoming calls from disturbing the user and interrupting the network access through the call transfer function, which greatly improves the user experience.

Figure 5:
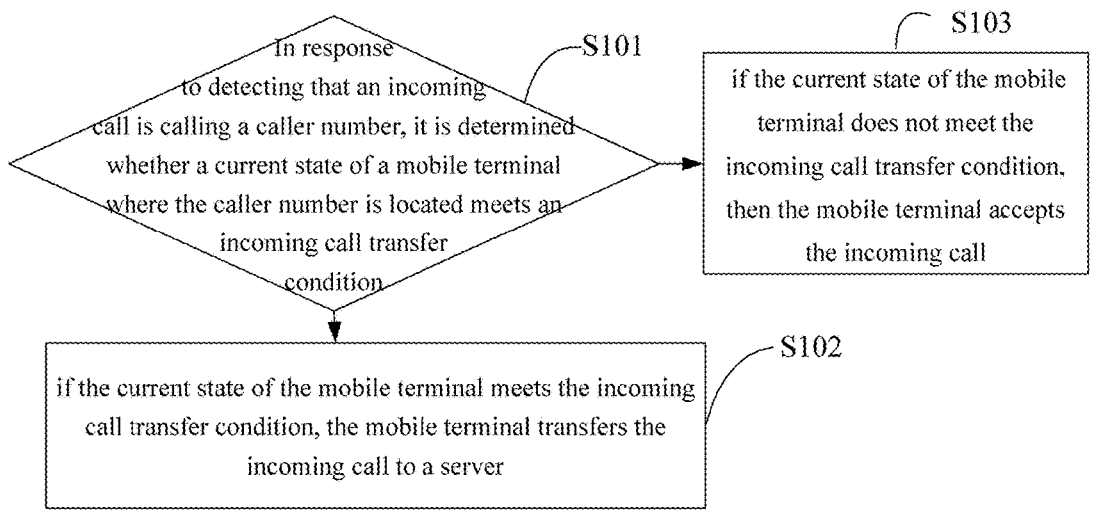
FIG. 5 is a flowchart of a method for processing incoming calls according to an embodiment of the present disclosure.

As shown in FIG. 5, FIG. 5 is a method for processing incoming calls according to an embodiment of the present disclosure, and based on the embodiment shown in FIG. 4, after the step S101, in which it is determined whether a current state of a mobile terminal where the caller number is located meets an incoming call transfer condition in FIG. 4, the method further includes:

Step S103, if the current state of the mobile terminal does not meet the incoming call transfer condition, then the mobile terminal accepts the incoming call.

According to the present embodiment, when the mobile terminal does not meet the incoming call transfer condition locally, e.g., the mobile terminal having not enabled the DND mode or the incoming call reminder service, the incoming call is directly directed to the mobile terminal, so as to improve the incoming call processing flexibility and satisfy the user's requirements in different scenarios.

Figure 6:
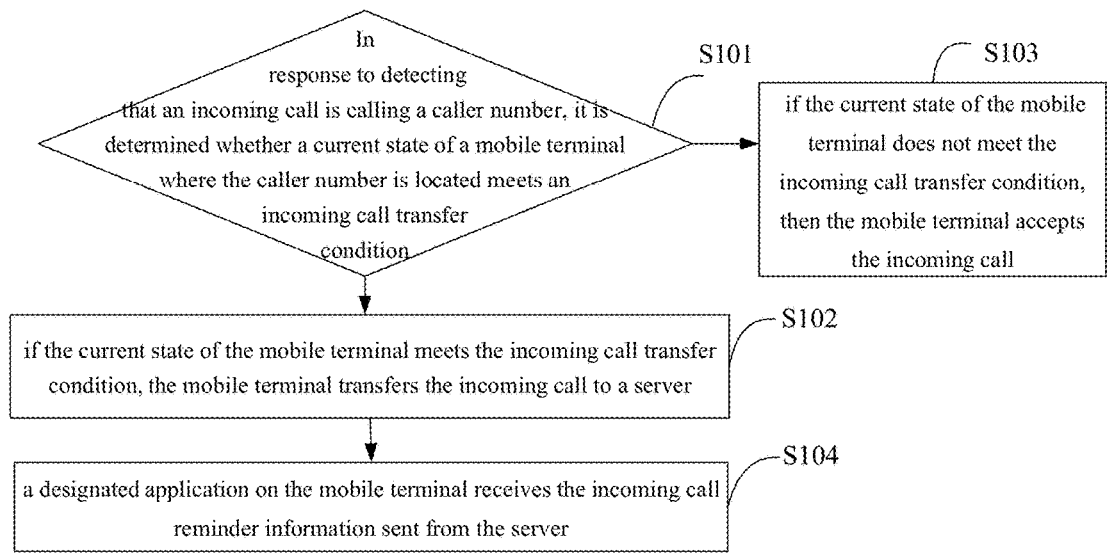
FIG. 6 is a flowchart of a method for processing incoming calls according to an embodiment of the present disclosure.

FIG. 6 shows a method for processing incoming calls according to an embodiment of the present disclosure, and based on the embodiment shown in FIG. 5, after transferring the incoming call to the server in the step S102, the method further includes:

Step S104, a designated application on the mobile terminal receives the incoming call reminder information sent from the server.

In the present embodiment, the mobile terminal may make a response to the incoming call reminder service sent from the server.

According to embodiment of the present disclosure, the server may send the incoming call reminder information to the mobile terminal directly, or may send the incoming call reminder information to the application on the mobile terminal.

The server may send the incoming call reminder information as an instant messaging message to an account of a target application (e.g., an account of the QQ application or the Wechat application) that supports instant messaging designated by the user, and the target application may run on other mobile terminals.

In the present embodiment, when it is detected that the incoming call is calling the caller number, if the current state of the mobile terminal meets the incoming call transfer condition, the mobile terminal transfers the incoming call to the server, so that the server sends the incoming call reminder information to the designated target application, and in this way, through the call transfer function, the present embodiment can prevent the incoming call from disturbing the user and interrupting the network access; in addition, the server may collect information on the incoming call, and send the incoming call reminder information to the application on the mobile terminal, or send the incoming call reminder information as an instant messaging message to the account of the application (e.g., an account of the QQ application or the Wechat application) that supports instant messaging designated by the user, to carry out the incoming call reminder service, so as to greatly improves the incoming call processing flexibility and user experience.

Figure 7:
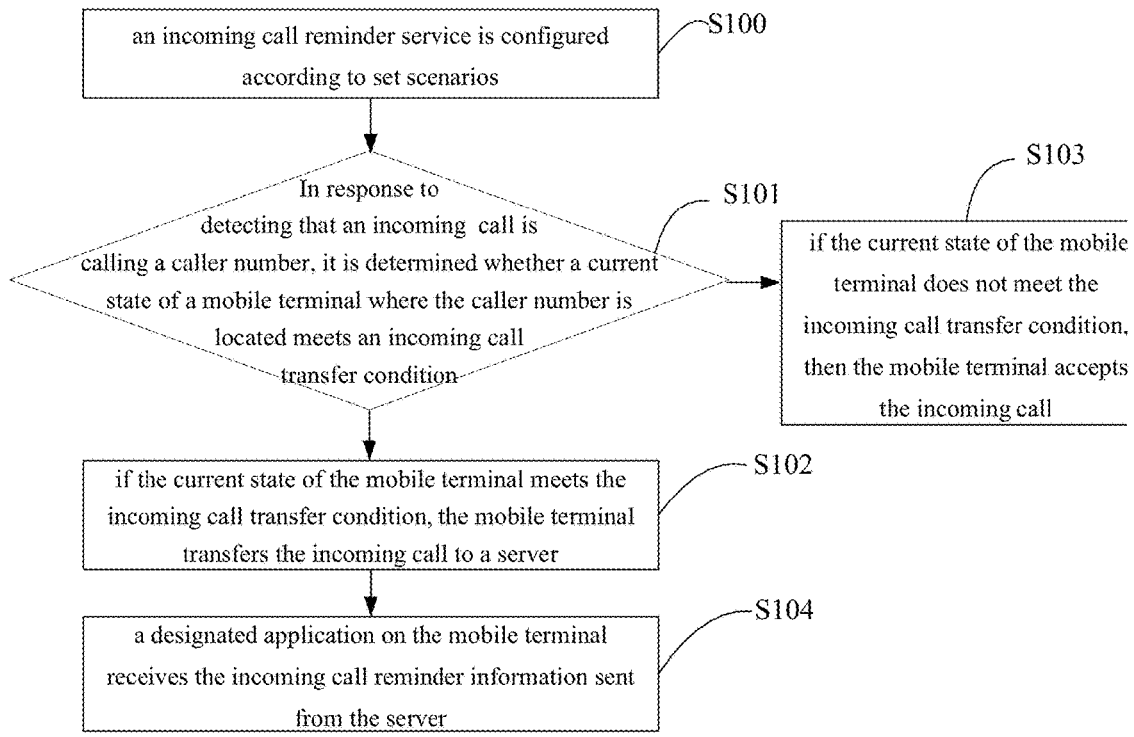
FIG. 7 is a flowchart of a method for processing incoming calls according to an embodiment of the present disclosure.

FIG. 7 shows a method for processing incoming calls according to an embodiment of the present disclosure, and based on the embodiment shown in FIG. 6, before detecting that an incoming call is calling a caller number in the step S101, the method further includes:

Step S100, an incoming call reminder service is configured according to set scenarios.

Specifically, the incoming call reminder service may be configured as an automatic mode or a manual mode according to different scenarios.

For the automatic mode, for example, the mobile terminal may be configured to automatically transfer an incoming call to the server in a circumstance where the network is active (e.g., the user is watching an online video, is watching a live program, or entering into an online game), and when there is an incoming call, the server may send an incoming call reminder message to the user, or automatically transfer the incoming call to a preset telephone number for the user to answer.

For the manual mode, for example, the mobile terminal may be configured to prompt the user whether to enable the incoming call reminder service or the DND mode during a scenario of power off, busy, or out of service, or before a game, and if the user confirms to enable the DND mode or the incoming call reminder service, then the mobile terminal enables the DND mode or the incoming call reminder service. Therefore, through the incoming call reminder service, the situation where a user cannot receive an incoming call reminder or view incoming call information due to low battery, long time busy, forgetting to bring the mobile phone, etc. may be avoided.

In this way, through the DND mode, the method can prevent the incoming call from interrupting the network access, and through though the incoming call reminder service, the method can solve the situation where the user cannot receive an incoming call reminder or view incoming call information due to low battery, long time busy, forgetting to take the mobile phone, etc.

The mobile terminal determines whether to enable the DND mode in different scenarios according to the setting rules described above.

In addition, when configuring an incoming call reminder service policy for the mobile terminal, an account of a target application such as an account of the QQ application, the Wechat application, or the Weibo application to which the incoming call reminder information is sent may be configured for the mobile terminal.

According to the foregoing solution in the present embodiment, the mobile terminal is configured with the incoming call reminder service and the DND mode according to set scenarios, and when it is detected that the incoming call is calling the caller number, if the current state of the mobile terminal meets the incoming call transfer condition, the mobile terminal transfers the incoming call to the server, so that the server sends the incoming call reminder information to the designated target application, thereby, through the incoming call transfer, the method prevents the incoming call from disturbing the user and interrupting the network access; in addition, the server collects the incoming call information, and sends the incoming call reminder information to the application on the mobile terminal, or sends the incoming call reminder information as an instant messaging message to the account of the application (e.g., an account of the QQ application or the Wechat application) that supports instant messaging designated by the user, to carry on the incoming call reminder service, so as to greatly improves the incoming call processing flexibility and user experience.

An example of a specific application scenario is as follows:

When the user is using a mobile phone, he may configure the mobile phone to enable an incoming call reminder service when the mobile phone enters into a game application, and may configure an account of the QQ application to receive incoming call reminder information in advance.

When the user is playing the game using the mobile phone and receives an incoming call, since the mobile phone has enabled the incoming call reminder service, the mobile phone automatically transfers the incoming call to the server, and the server sends incoming call reminder information to the account of the QQ application of the user. Thus, the user can receive the incoming call reminder information through his account of the QQ application. The QQ application may run on the current mobile phone of the user, or may run on a computer or other mobile phones, and the account of the QQ application is logged on to. In this way, through the call transfer function, the embodiment can prevent incoming calls from disturbing the user and interrupting the network access as to affect the user to operate the game. In addition, the server may collect information on the incoming calls and send the incoming call reminder information to the application on the mobile terminal, or send the incoming call reminder information as an instant messaging message to an account of an application (e.g., an account of the QQ application, or the Wechat application) that supports instant messaging designated by the user, to provide the incoming call reminder service, so as to greatly improve the incoming call processing flexibility and user experience.

Figure 8:
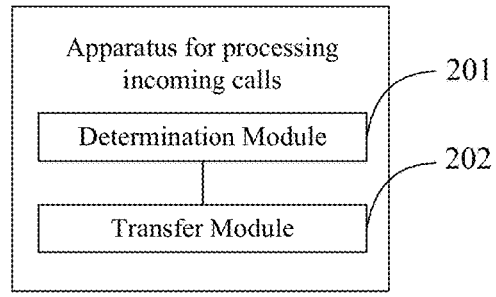
FIG. 8 is a schematic diagram of functional modules of an apparatus for processing incoming calls according to an embodiment of the present disclosure.

FIG. 8 shows an apparatus for processing incoming calls according to an embodiment of the present disclosure. The apparatus for processing incoming calls may be located on a mobile terminal or a network server in the form of hardware or software. The present embodiment is described using the mobile terminal as an example.

The present embodiment can realize the interception of incoming calls and carry on a corresponding call reminder service, to prevent incoming calls from disturbing the user and interrupting the network access through a call transfer function; in addition, the server may collect information on the incoming calls, and send incoming call reminder information to an application of the mobile terminal, or send the incoming call reminder information as an instant messaging message to an account of an application (e.g., an account of the QQ application or the Wechat application) that supports instant messaging designated by the user, to carry out the incoming call reminder service, so as to greatly improve the incoming call processing flexibility and user experience.

The apparatus for processing incoming calls may include a determination module 201 and a transfer module 202.

The determination module 201 is configured to determine whether a current state of a mobile terminal where a caller number is located meets an incoming call transfer condition in response to detecting that an incoming call is calling the caller number. The incoming call transfer condition for example includes the mobile terminal being using network access.

The transfer module 202 is configured to transfer the incoming call to a server, in response to determining that the current state of the mobile terminal meets the incoming call transfer condition, so that the server sends incoming call reminder information to a target application designated.

Specifically, the following manners may be used to determine whether the current state of the mobile terminal meets the incoming call transfer condition:

determining whether the mobile terminal currently has enabled an incoming call reminder service or a DND mode, or determining whether the current state of the mobile terminal is in a set scenario. The set scenario for example includes a scenario where an online application is run or an online video is being played, or a scenario where the mobile terminal is power off, busy, or out of service.

The enablement of the incoming call reminder service or the DND mode may be configured according to different scenarios in advance, and may be classified as an automatic mode and a manual mode.

For the automatic mode, for example, the mobile terminal may be configured to automatically transfer an incoming call to the server in a circumstance where the network is active (e.g., the user is watching an online video, is watching a live program, or entering into an online game), and when there is an incoming call, the server may send an incoming call reminder message to the user, or may automatically transfer the incoming call to a preset telephone number for the user to answer.

For the manual mode, for example, the mobile terminal may be configured to prompt the user whether to enable the incoming call reminder service or the DND mode during a scenario of power off, busy, or out of service, or before a game, and if the user confirms to enable the DND mode or the incoming call reminder service, then the mobile terminal enables the DND mode or the incoming call reminder service. Therefore, through the incoming call reminder service, the situation where a user cannot receive an incoming call reminder or view incoming call information due to low battery, long time busy, forgetting to taking the mobile phone, etc. may be avoided.

The mobile terminal determines whether to enable the DND mode in different scenarios according to the setting rules described above.

After receiving an incoming call, the mobile terminal first determines whether the current state of the local meets the incoming call transfer condition, so as to perform a directing service or perform a DND operation and a reminder service for the incoming call.

If the current state of the local meets the incoming call transfer condition, then the mobile terminal transfers the incoming call to the server or a designated telephone number.

Further, the transfer module 202 is further configured to direct the incoming call to the mobile terminal when the current state of the mobile terminal does not meet the incoming call transfer condition.

Specifically, if the current state of the mobile terminal satisfies the incoming call transfer condition, the mobile phone transfers the incoming call to the server, so that the server sends incoming call reminder information to a target application designated.

As an implementation, the server may send the incoming call reminder information to an application on the mobile terminal. The server may send the incoming call reminder information as an instant messaging message to an account of a target application (e.g., an account of the QQ application or the Wechat application) that supports instant messaging designated by the user, and the target application may run on other mobile terminals.

Therefore, the mobile terminal may be configured with a designated target application to receive the incoming call reminder information in advance, and send the configuration information on the designated target application to the server, so that the server sends the incoming call reminder information to the designated target application.

The mobile terminal may also accept the incoming call when the current state of the mobile terminal does not meet the incoming call transfer condition according to a user setting policy; or may transfer the incoming call to a designated telephone number according to the user setting policy.

If the preconfigured policy is to transfer an incoming call to the server, then the mobile terminal transfers the incoming call to the server; and if the preconfigured policy is to transfer an incoming call to a designated telephone number, then the mobile terminal transfers the incoming call to the designated telephone number.

The preconfigured policy may be set by the user in advance according to actual situations. In the embodiment, according to a default setting, when the mobile terminal enables the DND mode or the incoming call reminder service, the mobile terminal transfers the incoming call to the server, so that the server processes the incoming call accordingly, e.g., transferring the incoming call to other mobile terminals, or making a corresponding incoming call reminder.

In addition, if the mobile terminal has not enabled the DND mode or the incoming call reminder service locally, according to the embodiment of the present disclosure, the incoming call may be directed to the mobile terminal; or the incoming call may be transferred to the server according to the user's operating instruction temporally, so that the server accepts the incoming call or makes a corresponding incoming call reminder.

Compared to the traditional technology, in which when network communications are carried out, e.g., a user playing an online game, watching an online video, watching an online sports event or performing other network communications under a network environment, usually the network access will be interrupted by an incoming call, which brings a bad surfing experience for the user, the embodiments of the present disclosure can prevent the incoming calls from disturbing the user and interrupting the network access through the call transfer function, which greatly improves the user experience.

Figure 9:
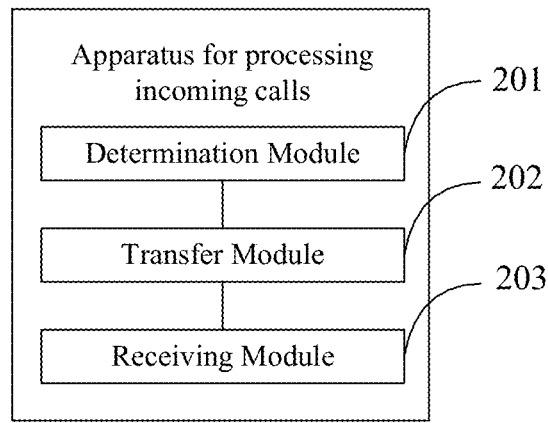
FIG. 9 is a schematic diagram of functional modules of an apparatus for processing incoming calls according to an embodiment of the present disclosure.

FIG. 9 shows an apparatus for processing incoming calls according to an embodiment of the present disclosure, and based on the embodiment shown in FIG. 8, the apparatus further includes:

a receiving module 203 to receive incoming call reminder information sent by the server in a designated application on the mobile terminal.

In the present embodiment, the mobile terminal may respond to the incoming call reminder service sent by the server.

To be specific, as an implementation, the server may send the incoming call reminder information directly to the mobile terminal.

As another implementation, the server may also send the incoming call reminder information to an application within the mobile terminal.

The server may send the incoming call reminder information to an account of a target application (e.g., an account of the QQ application or the Wechat application) that supports instant messaging designated by the user, and the account of the target application may run on other mobile terminals.

In the present embodiment, when it is detected that the incoming call is calling the caller number, if the current state of the mobile terminal meets the incoming call transfer condition, the mobile terminal transfers the incoming call to the server, so that the server sends the incoming call reminder information to the designated target application, and in this way, through the call transfer function, the present embodiment can prevent the incoming call from disturbing the user and interrupting the network access; in addition, the server may collect information on the incoming call, and send the incoming call reminder information to the application on the mobile terminal, or send the incoming call reminder information as an instant messaging message to the account of the application (e.g., an account of the QQ application or the Wechat application) that supports instant messaging designated by the user, to carry out the incoming call reminder service, so as to greatly improves the incoming call processing flexibility and user experience.

Figure 10:
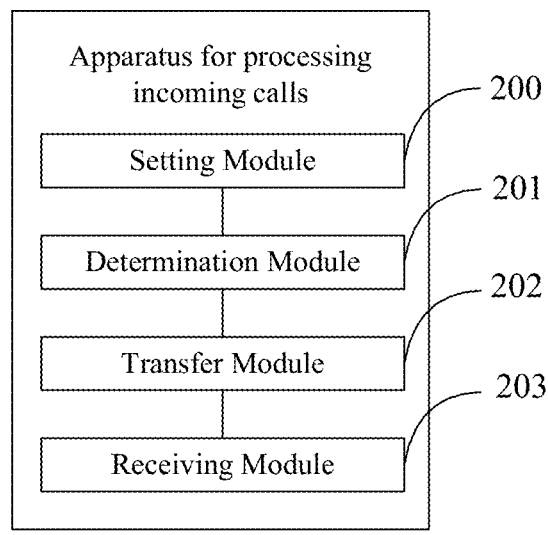
FIG. 10 is a schematic diagram of functional modules of an apparatus for processing incoming calls according to an embodiment of the present disclosure.

FIG. 10 shows an apparatus for processing incoming calls according to an embodiment of the present disclosure, and based on the embodiment shown in FIG. 9, the apparatus further includes:

a setting module 200 to set an incoming call reminder service according to a set scenario, configure a designated target application to receive the incoming call reminder information, and send the configuration information to the server, so that the server sends incoming call reminder information to the designated target application.

Specifically, when a scenario is a set scenario of running an online application or playing an online video, then the setting module 200 configures that when the mobile terminal opens the set online application or the online video, the mobile terminal automatically enables the DND mode and the incoming call reminder service; and if the scenario is a set scenario of power off, busy, or out of service, then it may be configured to enable the DND mode or the incoming call reminder service according to an operation instruction of the user, when the mobile terminal is power off, busy, or out of service.

Specifically, the incoming call reminder service may be set as an automatic mode and a manual mode according to different scenarios.

For the automatic mode, for example, it may be configured to automatically transfer an incoming call to the server in a circumstance where the network is active (e.g., the user is watching an online video, is watching an online program, or is playing an online game), and the server sends an incoming call reminder message to the user when there is an incoming call, or may be configured to automatically transfer an incoming call to a preset telephone number for the user to answer.

For the manual mode, for example, the mobile terminal may be configured to prompt the user whether to enable the DND mode or the incoming call reminder service during a scenario of power off, busy, or out of service or before playing a game. If the user confirms to enable the DND mode or the incoming call reminder service, then the mobile terminal enables the DND mode or the incoming call reminder service according to an operation instruction from the user. Of course, the manual mode may also be configured for during network communications, such as performing a video live and downloading a file, to prompt the user whether to enable the DND mode or the incoming call reminder service.

In this way, through the DND mode, the interruption in network access caused by an incoming call may be avoided, and through the incoming call reminder, a situation of unable to receive an incoming call reminder or read incoming call information due to the mobile phone being low battery, long time busy, or the user forgetting to take the mobile phone may be avoided.

The mobile terminal determines whether to enable the DND mode in different scenarios according to the setting rules described above.

In addition, when configuring an incoming call reminder service policy for the mobile terminal, an account of a target application such as an account of the QQ application, the Wechat application or the Weibo application that supports instant messaging to which the incoming call reminder information is sent may be configured for the mobile terminal.

According to the foregoing solution in the present embodiment, the mobile terminal is configured with the incoming call reminder service according to set scenarios, and when it is detected that the incoming call is calling the caller number, if the current state of the mobile terminal meets the incoming call transfer condition, the mobile terminal transfers the incoming call to the server, so that the server sends the incoming call reminder information to the designated target application, thereby, through the incoming call transfer, the method prevents the incoming call from disturbing the user and interrupting the network access; in addition, the server collects the incoming call information, and sends the incoming call reminder information to the application on the mobile terminal, or sends the incoming call reminder information as an instant messaging message to the account of the application (e.g., an account of the QQ application or the Wechat application) that supports instant messaging designated by the user, to carry on the incoming call reminder service, so as to greatly improves the incoming call processing flexibility and user experience.

It is also to be understood that the term "include", "comprise" or any other variant thereof is intended to encompass a non-exclusive inclusion in such a way that the process, method, product or device including a series of elements include not only those elements, but also other elements that are not explicitly listed, or include elements that are inherent to such process, method, product, or devices. In the absence of more restrictions, an element defined by the statement "including a . . . " do not preclude the presence of additional elements in the process, method, product or device that includes the element.

Through the description of the above embodiments, it will be apparent to those skilled in the art that the above-described embodiment methods can be realized by means of software and necessary general hardware platforms, and of course, through hardware. Based on this understanding, the technical solution of the present description may be embodied in the form of a software product that is stored in a storage medium (such as a ROM/RAM, a magnetic disk, an optic disk) includes a number of instructions for enabling a terminal device (which may be a mobile phone, a computer, a server, or a network device, etc.) to perform the methods described in the various embodiments of the present disclosure.

The foregoing descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for processing incoming calls, implemented on a mobile terminal, the method comprising:
   configuring, through an application on the mobile terminal, a designated target application for receiving incoming call reminder information, and sending configuration information of configuring the designated target application for receiving the incoming call reminder information to a server of the application;
   determining whether a current state of the mobile terminal where a caller number is located meets an incoming call transfer condition which comprises the mobile terminal using network access, in response to detecting that an incoming call is calling the caller number;
   transferring the incoming call to the server of the application in response to determining that the current state of the mobile terminal meets the incoming call transfer condition, for the server of the application to send incoming call reminder information to the designated target application; and
   receiving, by the designated target application on the mobile terminal, the incoming call reminder information sent from the server of the application.

2. The method of claim 1, wherein the step of determining whether a current state of a mobile terminal meets an incoming call transfer condition comprises:
   determining whether the current state of the mobile terminal is in a set scenario, wherein the set scenario at least comprises one of the following: running an online application or playing an online video with the network access.

3. The method of claim 2, wherein before the step of detecting that an incoming call is calling the caller number, the method further comprises:
   setting the incoming call reminder service according to the set scenario, which comprising:
   in response to a scenario being the set scenario of running an online application or playing an online video, then setting: automatically enabling the incoming call reminder service in response to the mobile terminal opening the online application or the online video.

4. The method of claim 1, wherein the designated target application is an instant messaging application, and the incoming call reminder information is formed into an instant messaging message and sent to an account of the instant messaging application.

5. An apparatus for processing incoming calls, comprising: a processor and a memory, wherein the memory stores instructions executable by the processor to cause the processor to perform the following steps:
   configuring, through an application on the mobile terminal, a designated target application for receiving incoming call reminder information, and sending configuration information of configuring the designated target application for receiving the incoming call reminder information to a server of the application;
   determining whether a current state of a mobile terminal where a caller number is located meets an incoming call transfer condition which comprises the mobile terminal using network access, in response to detecting that an incoming call is calling the caller number;
   transferring the incoming call to the server of the application in response to determining that the current state of the mobile terminal meets the incoming call transfer condition, for the server of the application to send incoming call reminder information to the designated target application; and
   receiving, by the designated target application on the mobile terminal, the incoming call reminder information sent from the server of the application.

6. The apparatus of claim 5, wherein the step of determining whether a current state of a mobile terminal meets an incoming call transfer condition comprises:
   determining whether the current state of the mobile terminal is in a set scenario, wherein the set scenario at least comprises one of the following: running an online application or playing an online video with the network access.

7. The apparatus of claim 6, wherein before the step of detecting that an incoming call is calling the caller number, the instructions further cause the processor to perform the following step:
   setting the incoming call reminder service according to the set scenario, which comprising:
   in response to a scenario being the set scenario of running an online application or playing an online video, then setting: automatically enabling the incoming call reminder service in response to the mobile terminal opening the online application or the online video.

8. A non-transitory computer-readable storage medium, comprising instructions executable by one or more processors to cause the one or more processors to perform operations comprising:
   configuring, through an application on the mobile terminal, a designated target application for receiving incoming call reminder information, and sending configuration information of configuring the designated target application for receiving the incoming call reminder information to a server of the application;
   determining whether a current state of a mobile terminal where a caller number is located meets an incoming call transfer condition which comprises the mobile terminal using network access, in response to detecting that an incoming call is calling the caller number; and
   transferring the incoming call to the server of the application in response to determining that the current state of the mobile terminal meets the incoming call transfer condition, for the server of the application to send incoming call reminder information to the designated target application; and receiving, by the designated target application on the mobile terminal, the incoming call reminder information sent from the server of the application.

9. The non-transitory computer-readable storage medium of claim 8, wherein the step of determining whether a current state of a mobile terminal meets an incoming call transfer condition comprises:
   determining whether the current state of the mobile terminal is in a set scenario, wherein the set scenario at least comprises one of the following: running an online application or playing an online video with the network access.

10. The non-transitory computer-readable storage medium of claim 9, wherein before the step of detecting that an incoming call is calling the caller number, the instructions further cause the one or more processors to perform:
   setting the incoming call reminder service according to the set scenario, which comprising:
   in response to a scenario being the set scenario of running an online application or playing an online video, then setting: automatically enabling the incoming call reminder service in response to the mobile terminal opening the online application or the online video.

* * * * *